(12) United States Patent
Copps et al.

(10) Patent No.: US 9,569,484 B2
(45) Date of Patent: *Feb. 14, 2017

(54) QUERY GENERATION SYSTEM FOR AN INFORMATION RETRIEVAL SYSTEM

(71) Applicant: Brainspace Corporation, Dallas, TX (US)

(72) Inventors: David S. Copps, Dallas, TX (US); Stephen S. Jernigan, Murphy, TX (US); Adam K. Keys, Dallas, TX (US)

(73) Assignee: Brainspace Corporation, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,072

(22) Filed: Jun. 29, 2015

(65) Prior Publication Data

US 2015/0379070 A1 Dec. 31, 2015

Related U.S. Application Data

(63) Continuation of application No. 12/129,387, filed on May 29, 2008, now Pat. No. 9,069,861.

(60) Provisional application No. 60/940,599, filed on May 29, 2007.

(51) Int. Cl.
*G06F 3/0482* (2013.01)
*G06F 3/0484* (2013.01)
*G06F 17/30* (2006.01)

(52) U.S. Cl.
CPC ....... *G06F 17/30392* (2013.01); *G06F 3/0482* (2013.01); *G06F 3/04842* (2013.01); *G06F 17/30867* (2013.01); *G06F 17/30967* (2013.01)

(58) Field of Classification Search
CPC ........... G06F 17/30392; G06F 3/04842; G06F 3/0482; G06F 17/30867; G06F 17/30967
See application file for complete search history.

(56) References Cited

U.S. PATENT DOCUMENTS

| | | | |
|---|---|---|---|
| 4,839,853 | A | 6/1989 | Deerwester et al. |
| 5,317,730 | A | 5/1994 | Moore et al. |
| 6,654,749 | B1 | 11/2003 | Nashed |
| 7,133,862 | B2 | 11/2006 | Hubert et al. |
| 2002/0103799 | A1 | 8/2002 | Bradford et al. |
| 2003/0069877 | A1 | 4/2003 | Grefenstette et al. |
| 2004/0030741 | A1 | 2/2004 | Wolton et al. |
| 2004/0181401 | A1 | 9/2004 | Pachet et al. |
| 2004/0181543 | A1 | 9/2004 | Wu et al. |
| 2004/0193579 | A1 | 9/2004 | Dettinger et al. |
| 2005/0182754 | A1 | 8/2005 | Madan et al. |
| 2006/0294311 | A1 | 12/2006 | Fu et al. |

(Continued)

*Primary Examiner* — Jorge A Casanova
(74) *Attorney, Agent, or Firm* — Baker Botts L.L.P.

(57) ABSTRACT

According to one embodiment of the disclosure, a query generation system generally includes an element rank and inference engine in communication with a computing system and a user interface. The element rank and inference engine is operable to receive a user supplied element from the user interface, the user supplied element being associated with a first filter criterion. The element rank and inference engine is also operable to create, using the first filter criterion, at least one second element and rank according to their relative importance, the at least one first element and the at least one second element according to their associated first filter criterion and second filter criterion. Next, the element rank and inference engine may output the at least one first filter element and the second filter element to the computing system.

20 Claims, 5 Drawing Sheets

(56) References Cited

U.S. PATENT DOCUMENTS

2007/0050339 A1  3/2007  Kasperski et al.

QUERY GENERATION SYSTEM FOR AN INFORMATION RETRIEVAL SYSTEM

RELATED APPLICATION

This application is a continuation of U.S. application Ser. No. 12/129,387 filed May 29, 2008 and entitled "Query Generation System for an Information Retrieval System," which claims priority to U.S. Patent Application Ser. No. 60/940,599, entitled "Query Generation System for an Information Retrieval System," filed on May 29, 2007.

TECHNICAL FIELD OF THE DISCLOSURE

This disclosure generally relates to computing systems, and more particularly, to an query generation system for an information retrieval system and method of use.

BACKGROUND OF THE DISCLOSURE

Information retrieval systems are provided to assist in the retrieval of information from various types of computing systems. The Internet generally includes a network of computing systems providing readily available information that may be relatively diverse in content. Information retrieval systems that provide search capabilities of information contained on the Internet are commonly referred to as search engines.

SUMMARY OF THE DISCLOSURE

According to one embodiment of the disclosure, a query generation system generally includes an element rank and inference engine in communication with a computing system and a user interface. The element rank and inference engine is operable to receive a user supplied element from the user interface, the user supplied element being associated with a first filter criterion. The element rank and inference engine is also operable to create, using the first filter criterion, at least one second element and rank according to their relative importance, the at least one first element and the at least one second element according to their associated first filter criterion and second filter criterion. Next, the element rank and inference engine may output the at least one first filter element and the second filter element to the computing system.

Some embodiments of the invention provide numerous technical advantages. Some embodiments may benefit from some, none, or all of these advantages. For example, according to one embodiment, the query generation system may simplify the automatic visual generation of a modifiable data object that may be derived from user supplied elements. This automatic visual generation may include modification of various visual aspects of elements displayed upon a display. For example, the filter criteria of each element of the data object may modified by manipulating the spatial order, the color, the size, the shape, the order, the relative proximity, the boldness, and/or texture of one element relative to another. By manipulation of the various visual aspects of elements, the user may be able to easily tailor filter criteria of each element to enhance the filtering capability of the information retrieval system.

Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Information retrieval systems, such as search engines, have provided one approach for finding desired information from the vast information available on various distributed computing systems, such as the Internet or corporate networks referred to generally as intranets. The typical search engine usually functions by retrieving information based upon one or more text elements commonly referred to as keywords. Due to the relatively diverse nature of information provided by the Internet, however, results provided by known search engine implementations may include information that is beyond the scope desired by the user. That is, filtering of the relatively broad array of information available from the Internet using only keyword filtering may yield inadequate results in some cases.

Figure 1:
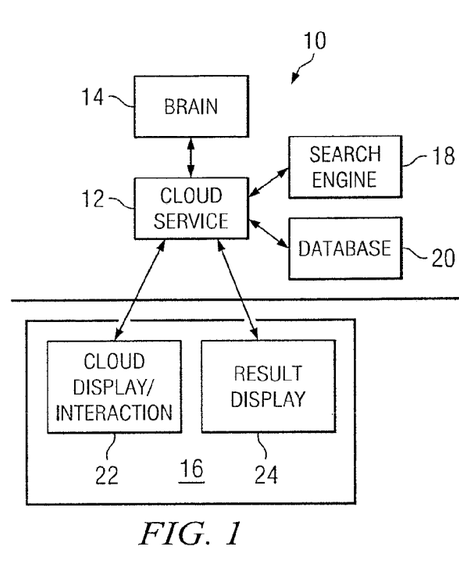
FIG. 1 is a diagram showing one embodiment of a query generation system according to the teachings of the present disclosure.

FIG. 1 shows one embodiment of an query generation system 10 that may provide enhanced search capabilities than those provided by known information retrieval systems. Query generation system 10 generally includes an element rank and inference server 12 and an element rank and inference engine 14 that are in communication with a user interface 16, a search engine 18, and a database 20. As will be described in detail below, the query generation system 10 is operable to enhance filtering of information provided by search engine 18 to user interface 16 by inferring additional elements, creating super elements, and/or ranking elements according to their relative importance. In this manner, results provided by search engine 18 may yield results that are relatively more pertinent to the type of information desired.

Element rank and inference engine 14 may be any suitable algorithm that may infer additional elements, create super elements, and/or rank these elements according to those provided by a user through the user interface 16. In one embodiment, element rank and inference engine 14 incorporates a latent semantic analysis algorithm. The latent semantic analysis algorithm uses vectoral analyses to conceptualize terms and their relationship to one another among a number of documents or records in a computing system. For a computing system such as the Internet, the element rank and inference engine 14 may be operable to filter available information in an enhanced manner.

Element rank and inference server 12 is operable to receive requests in the form of user supplied elements from the user interface 16, interact with element rank and inference engine 14 to derive other elements, such as inferred elements and/or super elements, and issue these elements to search engine 14 as a request for filtered information. In one embodiment, element rank and inference engine 14 and element rank and inference server 12 may be implemented with a processor executing computer instructions stored in a memory.

The one or more elements including user supplied elements, inferred elements, and/or super elements may be referred to as a data object. A data object may be any type of object that can be stored or processed within a computer. That is, each element may be a portion of a data object that can be stored or processed within a computing system. For example, each element may include a keyword, phrase, paragraph, or an entire document. The element may also include a photograph, an icon or other visual object having filterable characteristics. For example, a photograph or icon may include metadata having filterable characteristics useful for the element rank and inference engine 14. Further, each element may have user selectable filter criteria that may enable the user to tailor the rank or other characteristics of the elements. These filter criteria may include, for example, a spatial order, a color, size, a shape, an order, a relative proximity, a relative boldness, a relative texture of each of the elements relative to other elements.

User interface 16 generally includes an interactive element display portion 22 and a result display portion 24 that may be executable on a computing system, such as a desktop computer, laptop computer, personal digital assistant (PDA), or other similar device. The interactive element display portion 22 and a result display portion 24 may be in communication with element rank and inference server 14 using any suitable approach. In one embodiment, interactive element display portion 22 and a result display portion 24 may be in communication with element rank and inference server 12 using a communication link, such as, for example, an Ethernet link. In another embodiment, interactive element display portion 22 and a result display portion 24 may be executable on the same computing system as element rank and inference server 12 such that communication may be provided by internal system calls. In one embodiment, database 20 may be included for storage of data objects for use at a later time.

When a data object including a number of user supplied elements are inputted by the user, the element rank and inference engine 14 may create inferred elements, super elements, or rank any of these elements according to their relative importance. The user supplied elements along with the inferred elements and super elements are displayed upon the user interface 16. In this manner, the user may modify various visual aspects of each of the displayed elements. For example, a change in the size of a particular element may represents a change in importance, such that increasing the size of the element increases the Element rank and decreasing the element size decreases the rank of the element.

The changing of other attributes could have other meanings and purposes. Another example could be that within the Query Cloud representation the user is able to mark particular elements as required by attaching a specific symbol to the respective visual object; this would result in the particular element being required in each query results. Other symbols would have other meanings and purposes. The user may also able to add and remove elements to the data object.

In one embodiment, the user interface 16 may be able to suggest additional inferred elements or super elements, as well as keep track of removed elements for re-inclusion, into the data object at a later time. Another example contemplates arrangement the proximity of one element to another so that the elements must occur within the represented proximity within each given query result. At any point the user can submit the data object to the search engine 18, at which time the data object converted into a query that the search engine 18 understands. The results provided by the search engine 18 may be displayed on the result display portion 24 of the user interface 16. In one embodiment, the data object may be saved and loaded for later use.

Search engine 18 may operate in conjunction with any suitable computing system for retrieval of information. In one embodiment, search engine 18 is operable to retrieve information from a distributed computing system, such as the Internet or an intranet that may be implemented in a corporate network.

Figure 2:
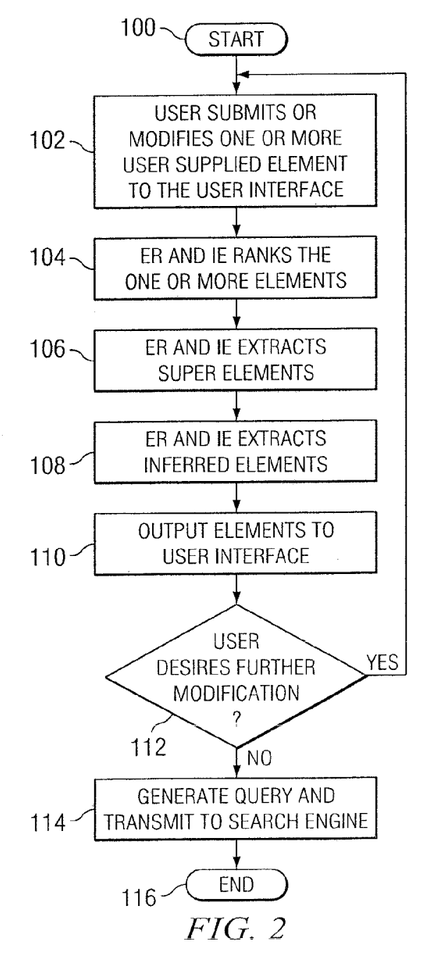
FIG. 2 is a flowchart showing a series of actions that may be performed by the embodiment of FIG. 1.

FIG. 2 is a flowchart showing one embodiment of a series of actions that may be performed by the query generation system 10 to provide enhanced search results of information available from a computing system. In act 100, the process is initiated. In act 102, the user may enter one or more elements into the user interface 16. Once entered, the one or more elements are then received by element rank and inference server 12.

In act 104, element rank and inference engine 14 interacts with element rank and inference server 12 by ranking the one or more elements according to their relative importance. In act 106, element rank and inference engine 14 may extract one or more super elements from two or more elements of the data object. A super element is generally referred to as a particular element that is combined from two or more elements such that the super element has a new or enhanced meaning. For example, the element rank and inference engine 14 may be operable to derive patterns, phrases, colloquialisms, or other language aspects of multiple elements in order to form a super element that may enhance the filtering capability of the query generation system 10. In act 108, element rank and inference engine 14 may create one or more inferred elements from the one or more elements. An inferred element generally refers to elements that are not in the one or more user supplied elements, but are determined to be related by the element rank and inference engine 14.

In act 110, element rank and inference engine 14 may output the data object including the user supplied elements, any super elements and/or inferred elements created by the element rank and inference engine 14 to the user interface 16. In act 112, the user may optionally modify elements in the data object by submitting additional user supplied elements or manually modifying existing elements in the data object.

The data object including user supplied elements, super elements, and/or inferred elements may be modified to enhance various filter criteria of the element. In one embodiment, each element of the data object may be modified by manipulating a particular visual aspect of the element on the user interface 16. For example, the user may include a "*" character next to a particular element to indicate that the particular term is a required field. As another example, the font of an element may be enlarged or reduced to modify its relative importance relative to other elements in the data object. In one embodiment, elements may be removed from the data object by the user. In another embodiment, these removed elements may be stored for inclusion back into the data object at a later time.

If the user desires no further modifications to the elements in the data object, processing continues at act 114 where a query is generated based upon the elements and transmitted to a search engine 18. The results returned by the search engine 18 may be displayed on the result display portion 24. Given these results, further filtering of the data object may be obtained by repeating actions 102 through 112 as needed or desired. At act 116 the process may be halted by interrupting element rank and inference engine 14 and element rank and inference server 12 and/or by removing power from the computing system.

FIG. 3A through 3D are screenshots showing several example of a user interface 16 for displaying elements and providing interaction with the query generation system 10 of the present disclosure. Search engine 18 may be any suitable system for receiving requests including filter criteria and serving filtered information in response to those requests. In this particular example, the user interface 16 may be provided in a browser, such as the Firefox™ browser.

Figure 3A:
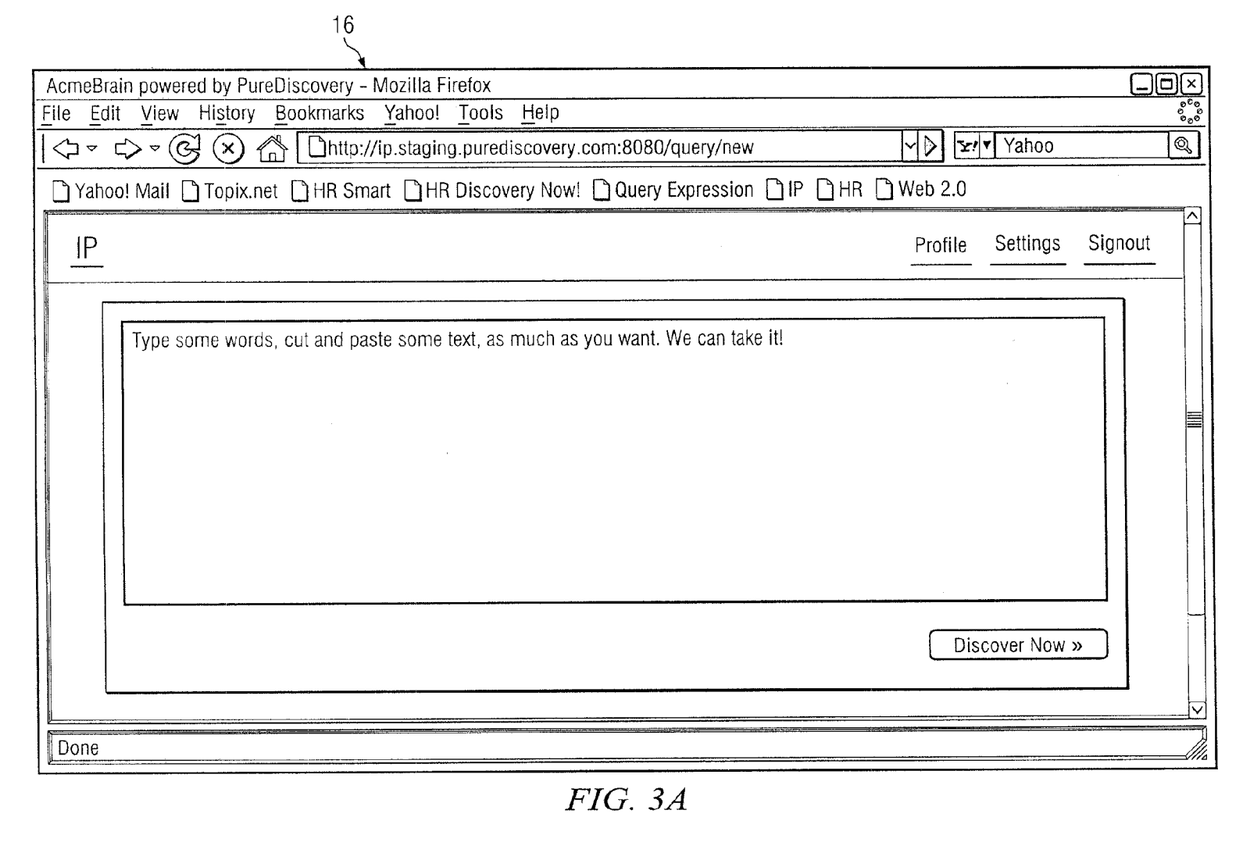
FIG. 3A is a screenshot showing one embodiment of an entry screen that may be displayed on the user interface of the embodiment of FIG. 1.
Figure 3B:
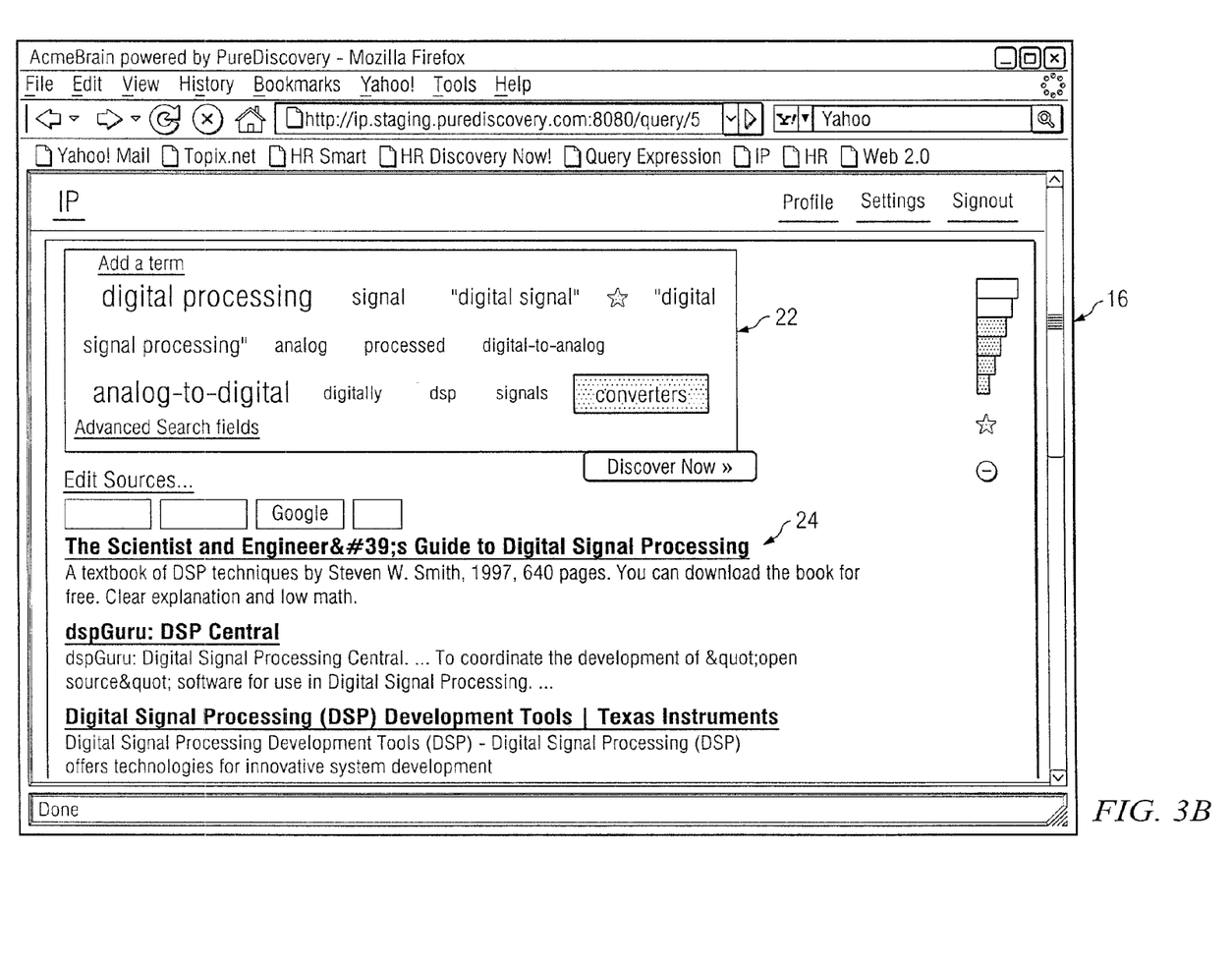
FIG. 3B is a screenshot showing an example of an interactive element display portion and a result display portion that are displayed upon the user interface of the embodiment of FIG. 1.
Figure 3C:
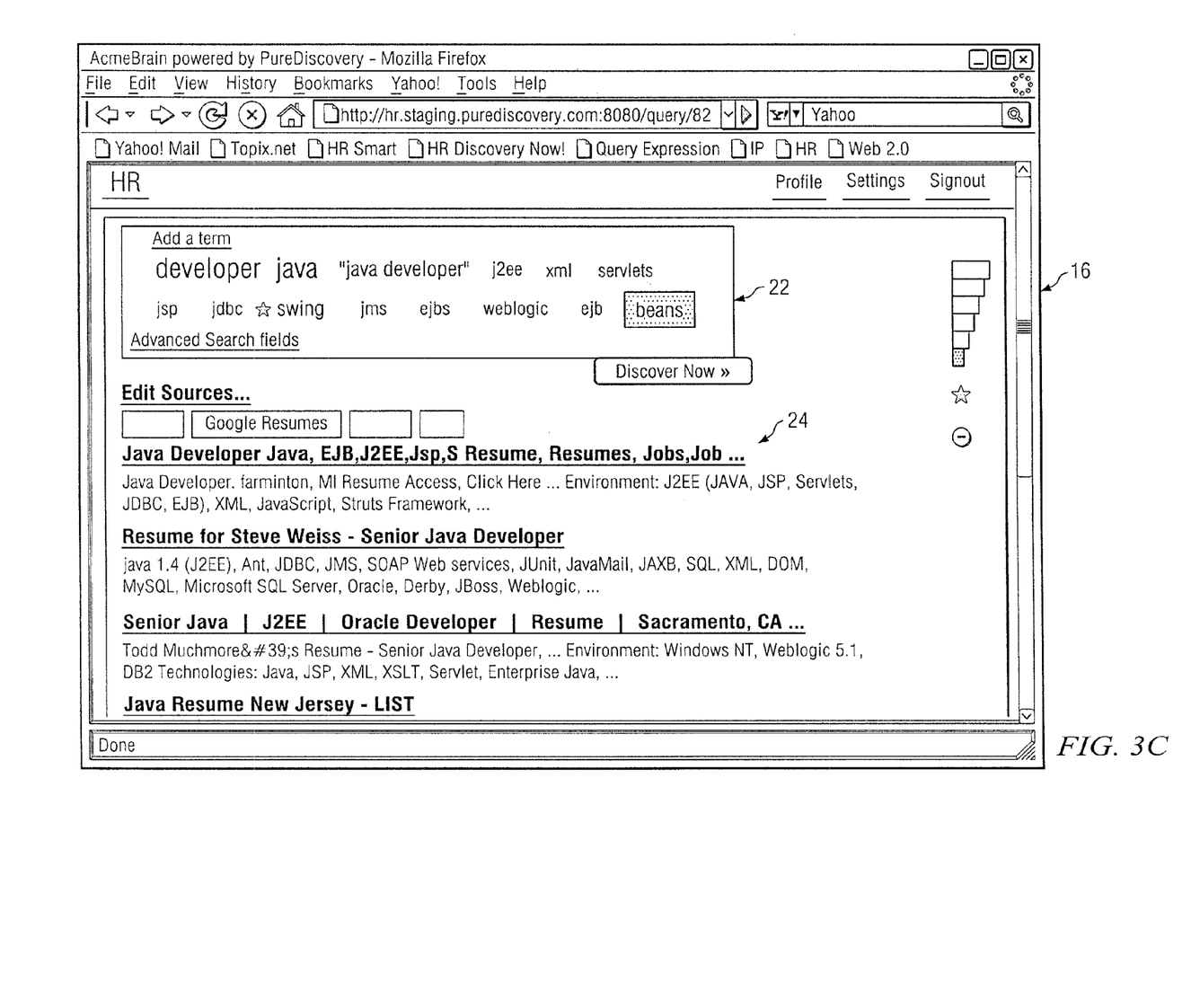
FIG. 3C is a screenshot showing an example of another interactive element display portion and a result display portion that are displayed upon the user interface of the embodiment of FIG. 1.
Figure 3D:
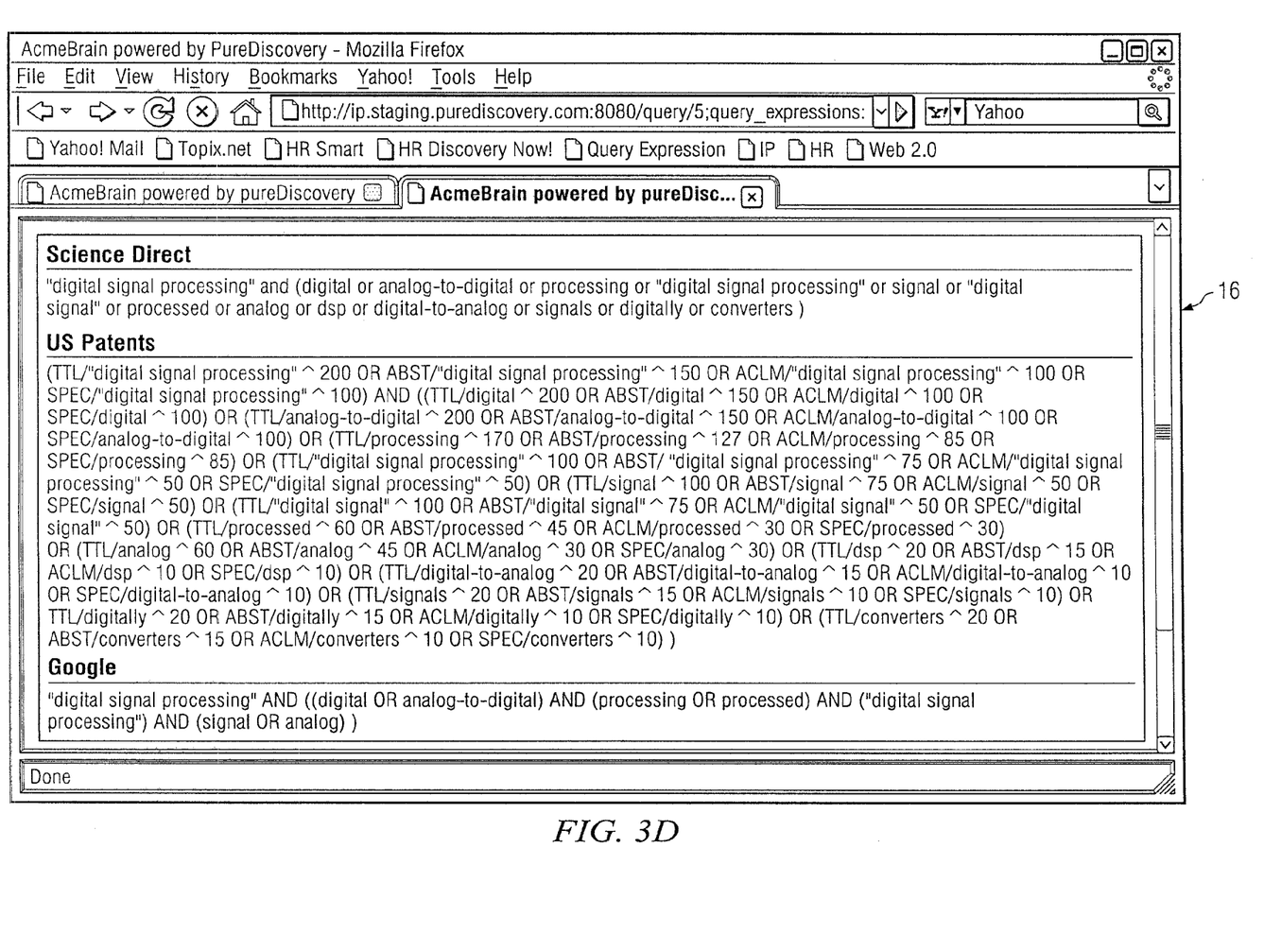
FIG. 3D is a screenshot showing an example query that may be transmitted to the search engine by the embodiment of FIG. 1.

FIG. 3A is a screenshot showing an example of an entry screen that may be displayed on the user interface 16. FIG. 3B is a screenshot showing an example of a element display portion 22 and a result display portion that are shown simultaneously. FIG. 3C is a screenshot showing another example of a element display portion 22 and a result display portion 24 that are displayed simultaneously. FIG. 3D is a screenshot showing an example query that may be transmitted to the search engine 18.

Although the present disclosure and its advantages have been described in detail, it should be understood that various changes, substitutions, and alterations can be made therein without departing from the spirit and scope of this disclosure as defined by the appended claims.

What is claimed is:

1. A system comprising:
   one or more memory devices; and
   a processor communicatively coupled to the one or more memory devices, the processor configured to:
      receive a plurality of user-supplied data objects from a user interface;
      derive, using latent semantic analysis, one or more inferred data objects using the plurality of user-supplied data objects;
      display the plurality of user-supplied data objects and the one or more inferred data objects in the user interface;
      receive user-specified filter criteria from the user interface for the plurality of user-supplied data objects and the one or more inferred data objects, wherein visual characteristics of the plurality of user-supplied data objects and the one or more inferred data objects are modified in the user interface according to the user-specified filter criteria; and
      generate a query using the user-supplied data objects, the one or more inferred data objects, and the user-specified filter criteria.

2. The system of claim 1, wherein the user-supplied data objects comprise one or more of:
   keywords;
   sentences;
   phrases;
   paragraphs;
   documents;
   photographs; and
   icons.

3. The system of claim 1, wherein the visual characteristics are selected from the group consisting of a spatial order, a color, a size, a shape, an order, a relative proximity, a relative boldness, a font, and a relative texture.

4. The system of claim 1, wherein:
   the user-specified filter criteria comprises specifying that one or more of the plurality of user-supplied data objects or the one or more inferred data objects are required to be included in the query; and
   modifying the visual characteristics comprises adding a symbol proximate to the one or more user-supplied data objects or the one or more inferred data objects that are required to be included in the query.

5. The system of claim 1, wherein:
   the user-specified filter criteria comprises specifying that at least one of the one or more of the plurality of user-supplied data objects or the one or more inferred data objects are important for the query; and
   modifying the visual characteristics comprises adding a symbol proximate to the one or more user-supplied data objects or the one or more inferred data objects that are specified as being important for the query.

6. The system of claim 1, wherein at least some of the user-supplied data objects comprise metadata, the metadata comprising filterable characteristics.

7. The system of claim 1, the processor further configured to:
   receive, following display of the plurality of user-supplied data objects and the one or more inferred data objects in the user interface, an additional user-supplied data object from the user interface; and
   remove, following display of the plurality of user-supplied data objects and the one or more inferred data objects in the user interface, one or more of the plurality of user-supplied data objects or the one or more inferred data objects from the user interface according to a user request from the user interface.

8. The system of claim 1, the processor further configured to transmit the query to a web search engine.

9. A method comprising:
   receiving, by one or more computer systems, a plurality of user-supplied data objects from a user interface;
   deriving, by the one or more computer systems using latent semantic analysis, one or more inferred data objects using the plurality of user-supplied data objects;
   displaying, by the one or more computer systems, the plurality of user-supplied data objects and the one or more inferred data objects in the user interface;
   receiving, by the one or more computer systems, user-specified filter criteria from the user interface for the plurality of user-supplied data objects and the one or more inferred data objects, wherein visual characteristics of the plurality of user-supplied data objects and the one or more inferred data objects are modified in the user interface according to the user-specified filter criteria; and
   generating, by the one or more computer systems, a query using the user-supplied data objects, the one or more inferred data objects, and the user-specified filter criteria.

10. The method of claim 9, wherein the user-supplied data objects comprise one or more of:
    keywords;
    sentences;
    phrases;

paragraphs;
documents;
photographs; and
icons.

11. The method of claim 9, wherein the visual characteristics are selected from the group consisting of a spatial order, a color, a size, a shape, an order, a relative proximity, a relative boldness, a font, and a relative texture.

12. The method of claim 9, wherein:
the user-specified filter criteria comprises specifying that one or more of the plurality of user-supplied data objects or the one or more inferred data objects are required to be included in the query; and
modifying the visual characteristics comprises adding a symbol proximate to the one or more user-supplied data objects or the one or more inferred data objects that are required to be included in the query.

13. The method of claim 9, wherein:
the user-specified filter criteria comprises specifying that at least one of the one or more of the plurality of user-supplied data objects or the one or more inferred data objects are important for the query; and
modifying the visual characteristics comprises adding a symbol proximate to the one or more user-supplied data objects or the one or more inferred data objects that are specified as being important for the query.

14. The method of claim 9, further comprising
receiving, by the one or more computer systems following display of the plurality of user-supplied data objects and the one or more inferred data objects in the user interface, an additional user-supplied data object from the user interface; and
removing, by the one or more computer systems following display of the plurality of user-supplied data objects and the one or more inferred data objects in the user interface, one or more of the plurality of user-supplied data objects or the one or more inferred data objects from the user interface according to a user request from the user interface.

15. One or more computer-readable non-transitory storage media in one or more computing systems, the media embodying logic that is configured when executed to:
receive a plurality of user-supplied data objects from a user interface;
derive, using latent semantic analysis, one or more inferred data objects using the plurality of user-supplied data objects;
display the plurality of user-supplied data objects and the one or more inferred data objects in the user interface;
receive user-specified filter criteria from the user interface for the plurality of user-supplied data objects and the one or more inferred data objects, wherein visual characteristics of the plurality of user-supplied data objects and the one or more inferred data objects are modified in the user interface according to the user-specified filter criteria; and
generate a query using the user-supplied data objects, the one or more inferred data objects, and the user-specified filter criteria.

16. The media of claim 15, wherein the user-supplied data objects comprise one or more of:
keywords;
sentences;
phrases;
paragraphs;
documents;
photographs; and
icons.

17. The media of claim 15, wherein the visual characteristics are selected from the group consisting of a spatial order, a color, a size, a shape, an order, a relative proximity, a relative boldness, a font, and a relative texture.

18. The media of claim 15, wherein:
the user-specified filter criteria comprises specifying that one or more of the plurality of user-supplied data objects or the one or more inferred data objects are required to be included in the query; and
modifying the visual characteristics comprises adding a symbol proximate to the one or more user-supplied data objects or the one or more inferred data objects that are required to be included in the query.

19. The media of claim 15, wherein:
the user-specified filter criteria comprises specifying that at least one of the one or more of the plurality of user-supplied data objects or the one or more inferred data objects are important for the query; and
modifying the visual characteristics comprises adding a symbol proximate to the one or more user-supplied data objects or the one or more inferred data objects that are specified as being important for the query.

20. The media of claim 15, the logic further configured to:
receive, following display of the plurality of user-supplied data objects and the one or more inferred data objects in the user interface, an additional user-supplied data object from the user interface; and
remove, following display of the plurality of user-supplied data objects and the one or more inferred data objects in the user interface, one or more of the plurality of user-supplied data objects or the one or more inferred data objects from the user interface according to a user request from the user interface.

* * * * *